May 22, 1956  H. L. WILLIAMS  2,746,113
WATER TIGHT FASTENER

Filed April 10, 1946  2 Sheets-Sheet 1

INVENTOR
Harvey L. Williams
BY
Blair, Curtis&Hayward
ATTORNEYS

May 22, 1956  H. L. WILLIAMS  2,746,113
WATER TIGHT FASTENER
Filed April 10, 1946  2 Sheets-Sheet 2
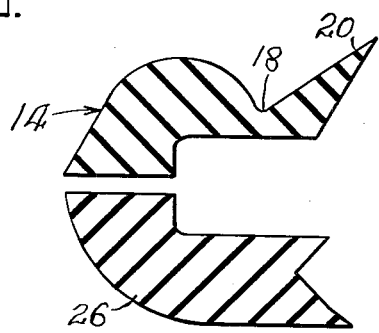
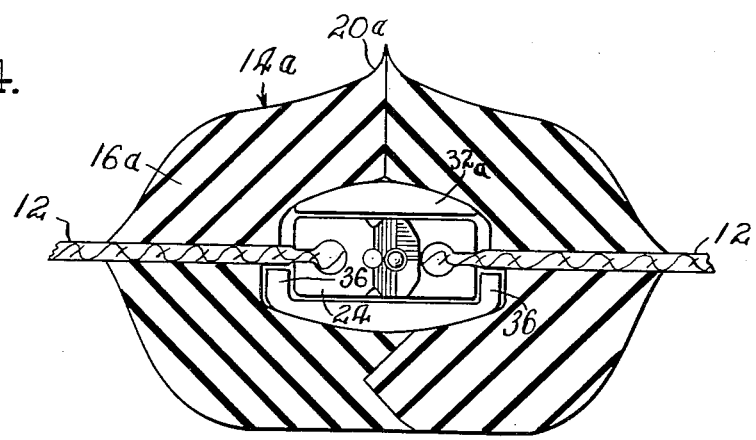
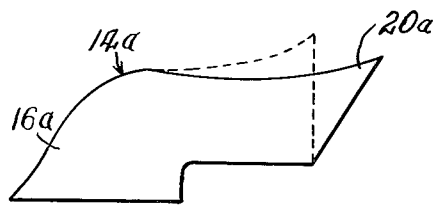
INVENTOR
*Harvey L. Williams*
BY
*Blair, Curtis & Hayward*
ATTORNEYS

United States Patent Office 2,746,113
Patented May 22, 1956

2,746,113

WATER TIGHT FASTENER

Harvey L. Williams, Hadlyme, Conn.

Application April 10, 1946, Serial No. 661,025

13 Claims. (Cl. 24—205.1)

This invention relates to a fluid-tight, and especially a water-tight seal. More particularly, the invention relates to a sealing device for use on slide fasteners to render them gas-and/or liquid-tight when closed, without impairing the facility of opening and closing.

Following upon the success of slide fasteners and other separable fasteners for closing access openings in clothing, containers, covers, etc., a demand quickly developed for a device which would seal such openings fluid-tight when closed by the slide fasteners. Many proposals have been made and various devices have been tried for this purpose of which the most successful consists of a sealing strip secured to each tape close to the interdigitating fingers (commonly called "scoops" in the trade) of the fastener chain. These strips have tapered extensions overlapping both chains of fingers when interlocked, but flexible enough to be turned aside by the slider which passes under them. While this structure has provided a good seal and given good results under controlled test conditions and in simple conditions of service, it fails when the pressure against it rises above a given limit because the tapered overlapping strips merely are squeezed apart by the pressure. Likewise, if such closed fastener chain is bent to a concave form the compressive stresses imposed produce wrinkling of the sealing strips which results in substantial leakage.

It is an object of the present invention, therefore, to provide a sealing device which will seal by its own resilient pressure when brought into operative relation, and will seal more tightly by imposition of higher, and even excessive, fluid pressure. Another object is to provide such a sealing device which is capable of withstanding relatively sharp bending, either concave or convex, without leakage or failure. Another object is to provide such sealing device which can be used on clothing without discomfort. Another object is to provide a rugged, efficient and reliable sealing device capable of quick closing and release. Other objects and advantages will be apparent from the following description.

Although in this specification and the accompanying drawings I have shown and described preferred embodiments of the invention and suggested various alternatives and modifications, it should be understood that these are not intended to be exhaustive or limiting of the invention but on the contrary are given for purposes of explaining the invention and principles thereof and the best manner of applying the invention to practical use so that others skilled in the art may be enabled to modify and adapt the invention and to apply it in numerous forms each as may be best adapted to the conditions of a particular use.

In the accompanying drawings:

Figure 3 is a cross-sectional view of individual strips used in the fastener of Figure 1;

Figure 4 is a cross-sectional view similiar to Figure 2 but showing modified strip and a modified attaching relation and an improved slider used therewith; and Figure 5 is a similar cross-sectional view showing one of the sealing strips of Figure 4 in relaxed condition.

Figure 1:
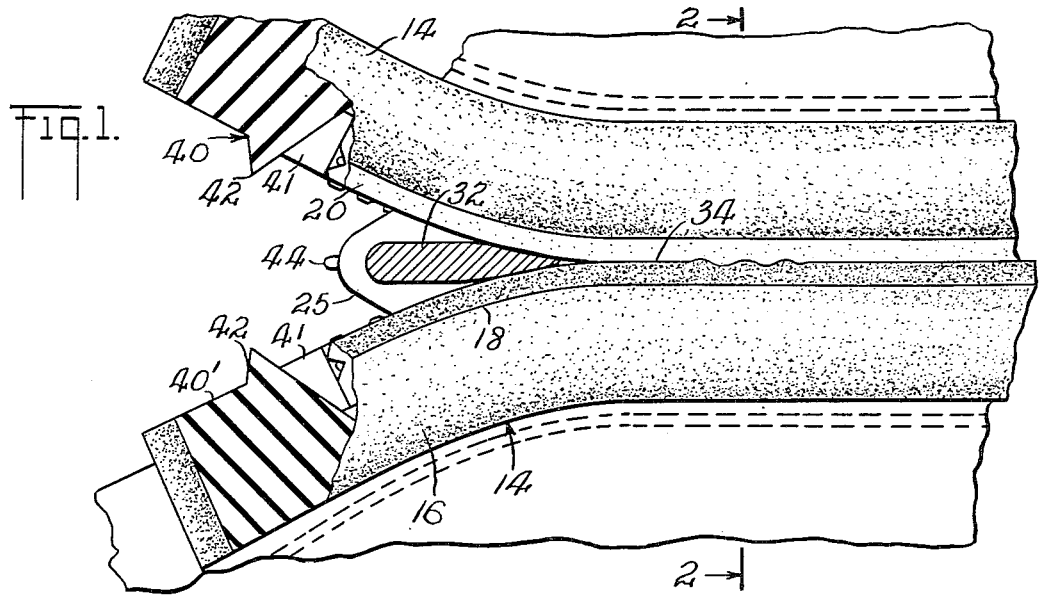
Figure 1 is a plan view of a closed slide fastener embodying the present invention, this figure being several times normal size for clearer showing.
Figure 2:
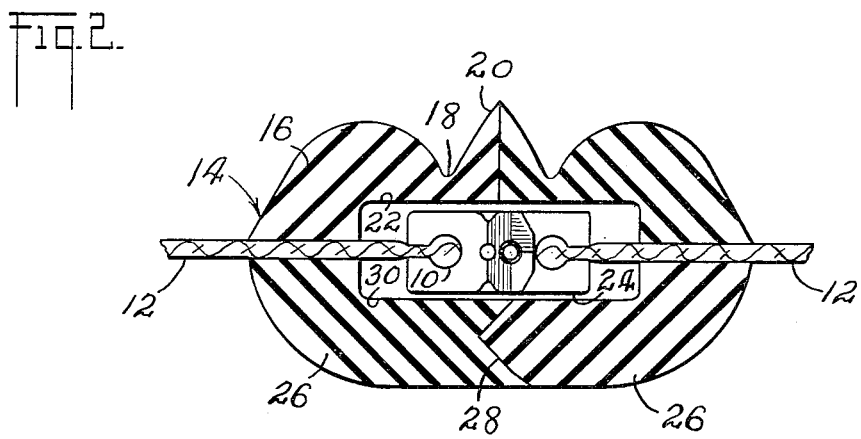
Figure 2 is a cross-sectional view taken on line 2—2 of Figure 1.

Referring first to Figures 1 and 2, a standard slide fastener is shown at 10 secured to waterproof tapes 12. Although these tapes are ordinarily separate narrow strips sewed and/or cemented to the material of the garment, container, cover, etc., the character of these tapes is not a part of the present invention, and they may even be a part of the goods of which the article is made. On each of the tapes is secured, e. g., by cementing thereto or by molding in situ, sealing strips 14 of rubber or other resiliently deformable fluid-tight material.

As shown in Figures 1–3 these sealing strips comprise an attaching portion 16 of relatively thick cross-section, a hinging portion 18 of reduced cross-section and a lip portion 20. The bottom of the strip is recessed at 22 to receive the slide fastener chain 24 with little or no clearance above and below, but a clearance from the heels of the fastener chain approximately slightly greater than the thickness of the flanges of the slider 25. In general, these clearances are made so that there is no wedging action by the edge of the slider tending to pull up the inner corner of the strip off from the tape 12, but only a bending of the portion above the slider with hinging in the outer portion 16. Although, as shown in Figure 2, the lips 20 are upstanding with their contact face perpendicular to the plane of the tapes 12 and fastener 24, this is the stressed sealing condition, and the normal relaxed form of the strip is as shown in Figure 3 with the lip sloping outward away from the portion 18. In this relaxed condition the heel or inner corner of the lip portion extends substantially to the pitch line of the slide fastener chain 24. This may extend somewhat beyond the pitch line so that when the slide fastener is closed these heel portions are slightly compressed but this is not necessary and in the closed condition these heel portions may be substantially relaxed. "Pitch line" is used here in its ordinary sense as applied to slide fasteners, etc. i. e., the line extending through the centers of the overlapping faces of the inter-digitating teeth or fingers.

On the bottom or inner side of tapes 12 are secured the counter balancing strips 26, 26' which advantageously meet in a tongue and groove 28 or other edge lock adapted to keep the edges flush. Such lock is not essential, but if not used, the meeting edges should be wide enough to prevent the edges from buckling one under the other. These strips also are recessed at 30 to receive the slide fastener chin 24 and the flanges of its slider.

When the interdigitating fastener chains 24 are brought together by their slider, the slider passes under the strip 14 the edges of the slider fitting within the clearance 22 and 30, while the top and bottom of the slider lift the portions 18 and 20 of strips 14 and the opposite portions of strips 26 and 26' as shown. The bail 32 of slider 25 passes between the lips 20. As the slider 25 passes, the lips 20 drop back together, the bottom corners being substantially relaxed or only slightly compressed, since they are positioned approximately along the pitch-line of the fastener chain 24, and the lips 20 being progressively under greater tension from the inner corners to the tips. The result of this is that the reaction to the sealing pressure does not tend to strip the portion 16 off the tape but merely produces a hinging stress in the area 18.

Since the lips 20 are pressed together by their own inherent resiliency and since they are resiliently flexible they form a tight seal and the greater the fluid pressure to which this seal is exposed, the tighter the lips will be pressed together and the tighter consequently will be the seal between them. In this respect they differ from such prior art devices, as mentioned above, wherein tapered members overlie one another in a plane more or less parallel to that of the slide fastener and tapes. External pressure of more than a few pounds per square inch on such prior art sealing devices has resulted in forcing the tapered members one from under the other until a leak develops between them. This cannot occur with the sealing device of the present invention. Similarly with the prior art devices, as mentioned above, a sharp bend in the length of the slide fastener chain produces a stretching of the sealing members and a consequent camming of the tapered portions with the same result of spreading them and permitting leakage between them. A transverse bend about the pitch line of the slide fastener or a twisting about the pitch line tends to open the tapered members of the prior art fasteners away from one another. Scuffing of the sealing strips as in scraping the body against the edge of a buoy or raft, etc., may readily lift the strips of the prior art fasteners, allowing leakage, and may even tear the strips so as to make a permanent leak. With the present invention, by contrast, the lips 20 are merely compressed or deflected, and no leakage occurs. No edge is exposed so as to catch and tear on sharp projections.

In the device shown in Figures 1 to 3 inclusive, the bending back of the lips 20 from their extended position, as shown in Figure 3, to the vertical face-to-face position, shown in Figure 2, puts the resilient material of the lips under such pressure that any bending of the fastener chain which may occur will merely increase or relieve some of the compression which already exists, so as to maintain the lips always in such contact as to prevent leakage.

As a result of such compression in the flexible tips of the lips 20, they may assume a more or less wavy or corrugated form at their tips as indicated at 34 on Figure 1, and this is most likely to occur where a concave bend is formed. The formation of such corrugations or wave line effects is unobjectionable and in fact are evidence of compressive forces which, due to the perpendicular contact face, compress the bottom corners of the strip into a more perfect seal.

The strips 26 and 26' on the underside of the fastener, although they may have some additional sealing effect, are primarily intended to counterbalance the reaction to the compression of the lips 20. If no strips were used under the slide fastener there would be a tendency for this reaction pressure in the strips 14 to bend the slide fastener chains about their pitch line; and, unless this tendency were counteracted by some means, such bending would cause binding of the fastener fingers on the slider so as to make opening and closing of the fastener very difficult. For this reason I have provided the simple counterbalancing strips 26 and 26'. The V-shaped tongue and groove edges, as indicated at 28, hold the strips in line and their surfaces flush. This feature, however, is not necessary, provided only that the design gives sufficient edge-to-edge engagement to prevent their buckling apart to relieve the counterbalancing pressure.

In Figures 4 and 5 there is shown a modified design of sealing strips 14a with a modified slider 32a. In this case the outer sealing strips 14a are made sufficiently heavy to resist buckling under the force necessary to effect the seal, and their edges slope outward so that, upon being pressed together, the tips are under greatest compression and thus are somewhat distorted to the forms shown in Figure 4. Because in this form the lips are not isolated from the rest of the strip, as by the reduced portion 18, the compressive force can be relieved only by bulging outward the material of the strip, or bending the strips bodily as shown in Figure 4.

The reaction pressure transmitted through strips 14a to the attaching portions 16a in a direction parallel to the tapes 12 is much greater with this form than with the form shown in Figure 2, and therefore it is advantageous to broaden the area of attachment and to bring it closer to the end of the fastener fingers 24 of the chain 10. This is accomplished as shown in Figure 4, by eliminating the flanges from the upper plane of the slider 32a and tapering its edges so that the strips 14a are attached to the ends of the fingers 24 and pass close to their outer surfaces. The guiding of the fingers for opening and closing of the slide fastener 10 is effected by the flanges 36 on the lower plane of the slider 32a. This latter feature is not restricted to the lip form 20a but can, of course, be used with any strip design.

Figure 5 shows in full lines the form of the strip 16a when relaxed prior to bringing the two fastener chains together. Even in this form the lip is more flexible than the part of the strip which covers the outside of the fastener chain, this of course being due, at least in part, to the tapering of the thickness toward the tip. An improved result can be obtained in this case as in Figures 1 to 3 by providing a recessed portion such as 18 in Figures 2 and 3, especially if the recess is close enough to the edge and so shaped as to give a tapered lip thinner throughout than the rest of the strip, but supported by the rest of the strip when pressed into sealing relation. The provision of such recess 18 or 18a allows the seal to be maintained with a greater movement between the strips 14 or 14a and reduces the force which it is necessary to withstand in the area of attachment between the strips and the face 12. Also it allows the inner corners of the lips to remain substantially relaxed and without buckling up the inner face where the two lips meet.

The sealing of the fastener at its ends may be effected in any desired manner. As shown in Figure 1, the upper edge is sealed by means of blocks 40 and 40', of rubber or other resiliently deformable material, molded over the ends of the tape and under the strips 14 and 26, which are broken away in Figure 1 for clearer showing of the end seal. These sealing members 39 and 39' may be molded and vulcanized in situ so as to make an integral bond with the strips 14 and 26, as well as with the tapes 12, or may be premolded and cemented to the strips and tapes. When the slider 25 is pulled to the end of the faster chain, the portions 41 enter the openings in the nose of the slider as "corks" or stoppers; and, with the final movement, its nose meets the sloping faces of the V-shaped sealing blocks 42, 42', and the points 42 of these sealing blocks engage the rib 44 on the nose of the slider, while the strips 14 and 26 engage the slider's sides and faces, and thus the end is fully sealed. As illustrated, the ends of the tapes 12 beyond the sealing blocks 40, 40', are free, but it will be understood that a similar arrangement may be used where the opening is merely a slit with the tapes permanently connected at both ends. In such case, the sealing blocks 40, instead of merely having projections at 42, will be formed to meet and compress against one another, e. g., in a manner similar to the strips 14 and 26, as at 20 and 28.

The opposite end of the opening may be closed merely by a block or sheet of rubber or other sealing material, molded or cemented over the ends of the strips 14 and tapes 12.

I claim:

1. A sealing device for slide fasteners of the type having chains of interengageable fingers secured in spaced relation on a flexible tape and a slider for guiding said fingers into and out of interdigitating engagement, which comprises a resiliently flexible and deformable sealing strip secured to said tape adjacent said fingers but otherwise free from the outer faces and adjacent edge portions of said fingers, extending across the outer faces of the fingers substantially to their pitch line and a thickened bead in the portion of said strip over the heels of the fingers, and a more flexible lip portion of said strip extending along its edge and when relaxed sloping outward beyond the pitch line, whereby a slider for opening and closing the slide fastener may pass under said sealing strip and, when two such chains are interlocked, the innermost edges of the strips substantially contact with little or no pressure and said lip portions are pressed together by their own resiliency due to greater deformation from their normal sloped position, and a portion of said strip between the bead and the lip being of less thickness than either.

2. A sealing device for slide fasteners of the type having chains of interengageable fingers secured in spaced relation on a flexible tape and a slider for guiding said fingers into and out of interdigitating engagement, which comprises a resiliently flexible and deformable sealing strip secured to said tape adjacent said fingers but otherwise free from the outer faces and adjacent edge portions of said fingers, extending across the outer faces of the fingers substantially to their pitch line and a more flexible lip portion of said strip extending along its edge and when relaxed sloping outward beyond the pitch line, whereby a slider for opening and closing the slide fastener may pass under said sealing strip and, when two such chains are interlocked, their innermost edges substantially contact with little or no pressure and said lip portions are pressed together by their own resiliency due to greater deformation from their normal sloped position, and a counterbalancing strip secured to the opposite side of the taper extending in closely spaced relation across the inner faces of the fingers substantially to said pitch line.

3. A sealing device for slide fasteners of the type having chains of interengageable fingers secured in spaced relation on a flexible tape and a slider for guiding said fingers into and out of interdigitating engagement, which comprises a resiliently deformable sealing strip secured to said tape adjacent said fingers, extending across the outer faces of the fingers substantially to their pitch line at a distance from the outward faces of the fingers sufficient to permit passage of the slider therebetween, a thickened bead in the portion of said strip over the heels of the fingers, and a more flexible lip portion of said strip extending along its edge and when relaxed sloping outward beyond the pitch line, whereby, when two such chains are interlocked, their innermost edges substantially contact with little or no pressure and said lip portions are pressed together by their own resiliency due to greater deformation from their normal sloped position, and a portion of said strip between the bead and the lip being of less thickness than either, and a counterbalancing strip secured to the opposite side of the tape extending in closely spaced relation across the inner faces of the fingers slightly beyond said pitch line.

4. A sealing device as defined in claim 2 wherein the said counterbalancing strips are substantially flat.

5. A sealing device as defined in claim 2 wherein the said counterbalancing strips are substantially flat and their abutting edges are provided with complementary tongue and groove formation.

6. A sealing device as defined in claim 2 wherein the said counterbalancing strips are substantially flat and attached to the parts of the respective tapes adjoining the fingers, and their abutting edges are provided with complementary tongue and groove formation, and the outer plane of the slider is tapered and without flanges while the inner plane is provided with flanges for guiding the fingers.

7. A sealing closure comprising a slide fastener structure having a pair of stringers and cooperating fastener elements at the margins of said stringers, and a pair of sealing elements generally L-shape in section providing base portions mounted at said fastener elements and free portions extending laterally from said base portions toward each other and overlying said fastener elements at a face of said structure, one of said free portions having a sealing surface extending substantially normal to said face and the other of said free portions having a marginal portion tapering to an edge and said other free portion presenting a second sealing surface extending substantially normal to said face and continuing to said edge, said sealing element being disposable with said sealing surfaces substantially in opposition and in position for sealing by lip-action of said edge against the first said surface, and means for bracing said sealing elements against separation from one another, said means comprising elements generally L-shape in section providing base portions on said stringers at the other face of said structure and portions extending laterally from said base portions toward each other and adapted to cooperate in abutting relation with one another for resisting flexure of said stringers tending to separate said sealing elements at said sealing surfaces.

8. A sealing closure comprising a structure having a pair of separable margins, both of which are subject to flexure, separable fastener elements at said margins interengaging one another and detachably uniting the margins in the closed condition of the closure, a flexible element on one of said margins at a face of the margins presenting a sealing surface extending substantially normal to said face, a flexible sealing element on the other of said margins at said face having a marginal portion overlying said fastener elements and tapering to an edge in the direction away from and substantially normal to said face and said sealing element presenting a second sealing surface extending substantially normal to said face and continuing to said edge, said sealing element being disposable with said sealing surfaces substantially in opposition and inclined toward one another in the open condition in position for sealing by lip-action of said edge against the first said sealing surface in the closed condition, and means at the other face of said margins and additional to said fastener elements for bracing said sealing element against separation from the first said sealing surface under flexure of said margins.

9. A sealing closure comprising a structure having a pair of separable adjacent margins both of which are subject to flexure and detachably united in the closed condition of the closure, sealing elements of flexible material on said margins at a face of the structure, said sealing elements having elastic marginal portions extending laterally toward each other and tapering to edges remote from said margins in the direction away from and substantially normal to said face and said sealing elements presenting sealing surfaces extending substantially normal to said face and continuing to said edges, said sealing elements being disposable with said sealing surfaces substantially opposite and inclined toward one another in the open condition in position for sealing by lip-action flexure of said edges in the closed condition, and means for bracing said sealing elements against separation from one another, said means comprising elements of flexible material on said margins disposed wholly at the opposite face of said structure and having lateral portions adapted to cooperate in abutting relation with one another for resisting flexure of said margins tending to separate said sealing elements at said sealing surfaces.

10. A sealing closure comprising a structure having a pair of separable adjacent margins both of which are subject to flexure and detachably united in the closed condition of the closure, separable fastener elements at the adjacent edges of said margins interengaging one another and detachably uniting the margins in the closed condition of the closure, a flexible element on one of said margins at a face of the structure and presenting a sealing surface extending substantially normal to said face, a sealing element of resilient rubber-like material generally L-shaped in section providing a base portion on the other of said margins at said face of the structure and a free portion extending laterally from said base portion toward said flexible element and overlying said fastener elements, said free portion tapering to an edge remote from said fastener elements in the direction away from and substantially normal to said face and presenting a second sealing surface extending substantially normal to said face and continuing to said edge, said sealing element being disposable with said sealing surfaces substantially opposite and relatively inclined toward one another in the open condition in position for sealing by lip-action flexure of said edge of the sealing elements against the first said sealing surface in the closed condition, and means comprising flexible material additional to said margins and said fastener elements at the other face of said structure for bracing said sealing element against separation from the first said sealing surface under flexure of said margins.

11. In a slide fastener structure comprising a pair of flexible stringers and cooperating teeth at the adjacent margins of said stringers, in combination, a pair of sealing elements of resilient rubber-like material on said stringers adjacent said teeth at a face of said structure, said sealing elements having free portions overlying said teeth in spaced-apart relation thereto and projecting laterally of said structure toward one another, said free portions tapering to edges remote from said teeth in the direction away from and substantially normal to said face and presenting sealing surfaces extending substantially normal to said face and continuing to said edges, said sealing surfaces being substantially opposite and inclined toward one another in the open condition of the closure and being in contact with one another at least at portions thereof immediately adjacent said edges in the closed condition, and bracing elements of resilient rubber-like material generally L-shaped in section providing base portions on said stringers at the other face of said structure and portions extending laterally from said base portions toward each other and adapted to cooperate in the closed condition in abutting relation to one another for resisting flexure of said stringers tending to separate said sealing elements at said sealing surfaces.

12. A sealing strip of resiliently flexible material for sealing together free edges of an article when said edges are secured together, which comprises a relatively stiff abutment portion with a bottom face fitted to the contour of said article in a zone adjacent one of said free edges, whereby to be secured in sealing relation thereon, a more flexible tapered lip integral with said abutment portion beyond said fitted face and, when relaxed, sloping outwardly, whereby two such strips may be pressed together edgewise to bring the inner faces of said lips into sealing contact with resilient deformation of the lips more extensive at their tips than at their bases, the under face of said strip being recessed beyond said fitted faces to receive the fingers of an interdigitating slide fastener with a portion along the strip over said recess between the lip and said attaching portion being of substantially lesser thickness than the latter, whereby any hinging will occur in said reduced portion and the attaching portion will thereby be saved from strains which would tend to tear it free.

13. A sealing strip of resiliently flexible material for sealing together free edges of an article when said edges are secured together, which comprises a relatively stiff abutment portion with a bottom face fitted to the contour of said article in a zone adjacent one of said free edges, whereby to be secured in sealing relation thereon, a more flexible tapered lip integral with said abutment portion beyond said fitted face and, when relaxed, sloping outwardly, whereby two such strips may be pressed together edgewise to bring the inner faces of said lips into sealing contact with resilient deformation of the lips more extensive at their tips than at their bases, said abutment portion and said lip portion being joined by an intermediate zone substantially thinner than either.

References Cited in the file of this patent
UNITED STATES PATENTS

| | | |
|---|---|---|
| 602,671 | Trench | Apr. 19, 1898 |
| 913,144 | James et al. | Feb. 23, 1909 |
| 1,876,338 | Norton | Sept. 6, 1932 |
| 1,991,943 | Keviczky | Feb. 19, 1935 |
| 2,095,270 | Silberman | Oct. 12, 1937 |
| 2,385,816 | Krupp | Oct. 2, 1945 |
| 2,557,827 | Krupp | June 19, 1951 |